April 1, 1958     D. F. CLARK ET AL     2,829,237
METHOD OF AND PRODUCT FORMED BY FLASH WELDING
Filed March 29, 1955
FIG. 1
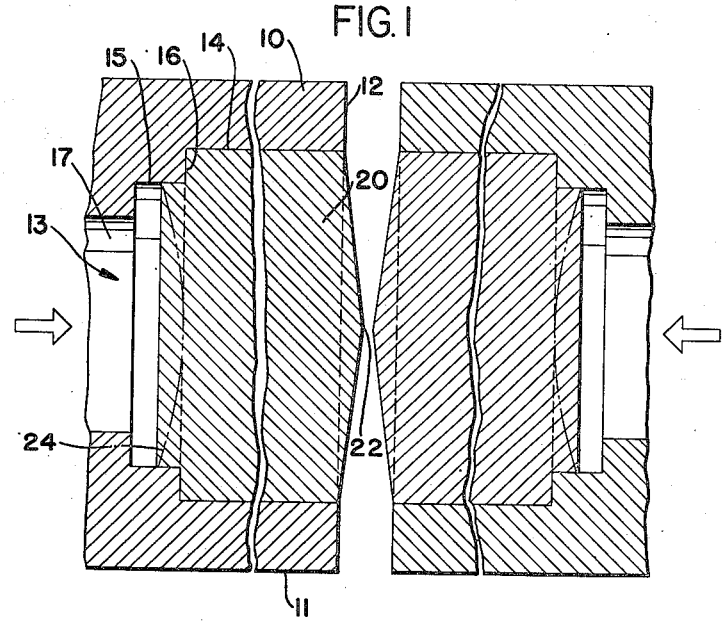
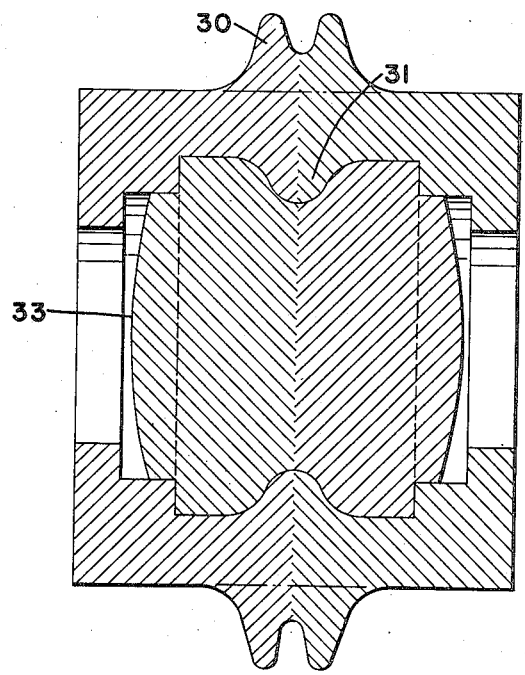
FIG. 2
*INVENTOR.*
DAVID F. CLARK &
BY ALFRED H. SCHOTT
ATTORNEY United States Patent Office 2,829,237
Patented Apr. 1, 1958

2,829,237

METHOD OF AND PRODUCT FORMED BY FLASH WELDING

David F. Clark, Shaker Heights, and Alfred H. Schott, Lyndhurst, Ohio, assignors to The Ohio Crankshaft Company, Cleveland, Ohio, a corporation of Ohio Application March 29, 1955, Serial No. 497,780

5 Claims. (Cl. 219—100)

This invention pertains to the art of electric flash welding and more particularly to the flash welding of hollow members.

The invention is particularly adapted to the flash welding together of the ends of half journals of sections of large crankshafts and will be described with particular reference thereto, although it will be appreciated that the invention has broader application such as the flash welding of the ends of elongated tubes or the like.

In the art of flash welding it has been conventional in the past to bring the ends of the metallic members to be welded into slightly spaced arcing relationship by imposing a low voltage between the members of a sufficiently low impedance to maintain the arc. The arcing between the members burns or melts away the metal and simultaneously heats the metal. As the metal burns away the members are gradually moved closer to each other. When the surfaces have reached the desired welding temperature the current is turned off and the heated ends are brought into high pressure engagement sufficient generally to upset the heated ends and effect a forge weld.

Where crankshafts are to be flash welded it has been conventional to make the half journals hollow and this hollow generally extends axially from one crank cheek to the other for reasons which have no connection with the present invention. A crankshaft with an opening through the crank cheek into the inside of the journal has been found to be much stronger than crankshafts having solid journals.

With such flash welded hollow journals difficulty has been experienced in the past with the molten metal thrown outwardly by the arcing sticking on the inside of the journal. This metal called "flash" must be removed.

Further, difficulty has been experienced with the upset on the inside of the hollow journal. The surface of this upset is extremely jagged and full of crevices, which are a point of stress concentration and thus a starting point for the ultimate failure of the crankshaft when in use. Thus, it has been necessary to remove both the upset and any of the flash which clings to the inside of the journal. If this were not removed small particles would eventually work free and contaminate the lubricating oil in which the crankshaft is usually bathed while in operation.

The present invention contemplates a new and improved arrangement for preventing the deposition of flash on the inside of the hollow journal and for controlling the shape of the inwardly extending upset so that it need not be machined away.

In accordance with the invention a pair of metal plugs are provided, one being placed in the end of each hollow tube or journal to be welded, the plug being so arranged that at least at the end of the flashing or heating cycle flashing occurs between the plugs and at least a portion of the plugs remain and are in abutting relationship. The plugs are also preferably so arranged that the forging or upset pressure is also applied to them.

With such an arrangement all of the metal which is burned out of the opposed surfaces is thrown outwardly beyond the external surfaces of the tube or journal. Further the plugs are in abutting relationship at the time that the ends of the tube are upset and resist and shape the inwardly extending upset on the hollow tube or journal.

Normally, the outwardly extending upset is removed by machining to a depth below the lower surface of any crevices which might be formed in the outwardly extending upset.

The principal object of the invention is the provision of a new and improved arrangement for preventing the formation of a flash on the interior of hollow members during a flash welding operation.

Another object of the invention is the provision of a new and improved arrangement for the flash welding of hollow members which comprises providing plugs for the hollow members which are burned off simultaneously with the members, such plugs preventing the formation of flash on the inside of such members.

Another object of the invention is the provision of a new and improved arrangement for shaping the upset on the inside of a hollow flash welded member. The invention may be embodied in certain parts and arrangements of parts, and certain steps and arrangements of steps, preferred embodiments of which will be described in this specification and illustrated in the accompanying drawing which is a part hereof and wherein:

Figure 1 shows fragmentary sections of a crankshaft pin or journal to be flashwelded with plugs in accordance with the present invention in operative position, the showing of Figure 1 being prior to the flashwelding operation.

Figure 2 shows the relationship of the members of Figure 1 after a flashwelding operation in accordance with the present invention has been completed.

Referring now to the drawings, Figure 1 shows two identical halves of a crankshaft pin or bearing 10, each pin having an outer circumferential surface 11, an end 12 which is to be welded, and an inner bore 13. This inner bore as shown is comprised generally of three portions, a first bore 14 extending inwardly from the surface 12, a second bore 15 of lesser diameter forming a shoulder 16 at the base of the bore 14 and a still further smaller bore 17 forming a shoulder 18 at the intersection of these two bores.

The bore 14, and if desired the other bores, may be machined to a predetermined size, which is generally coaxial with the outer surface 11. Positioned in the bore 14 is a plug 20, in accordance with the invention of a length to rest against the shoulder 16 and extend at least flush with the surface 12 and preferably beyond with a pointed portion extending beyond generally as is shown at 22.

This plug 20 has an outer diameter machined to a dimension so as to have an interference fit with the inner diameter of the bore 14. Normally the member 20 will be cooled in Dry Ice or the like so as to shrink its outer diameter and it is then press-fitted into the bore 14. In this way good electrical contact is obtained between the plug 20 and the crank pin half 10.

It will also be noted that the plug 20 has a short boss 24 on the outer surface which fits into the bore 15. This boss may, if desired, be eliminated.

By having the plug 20 positioned in the bore 14 with an interference fit, a good electrical contact exists between the two members. Also because of the tip 22, starting of the flashing operation is considerably facilitated, due to the initial relatively small contact area.

With the plug 20 mounted as is shown in Figure 1, the flashwelding operation may proceed as is conventional in the art. As is known, such a flashwelding operation creates by means of an electric arc and the burning away of the metal of the pin 10 and also of the plug 20 large amounts of heat which heat the members to the welding temperature. When the proper amount of metal has been burned off, as is conventional in the art, the current is then turned off and very high pressures are brought to bear axially on the members to create a forge weld. Such pressure forms an upset or radially outwardly extending portion 30 on the outer surface of the pin 10 which may subsequently be removed by machining. The upset 30 shown in Figure 2 is typical of a welding operation and actually forms no part of the present invention. In addition to the outwardly extending upset 30, an inwardly extending upset 31 forms which causes the plug 20 to be deformed inwardly substantially as is shown in Figure 2. This inward deformation of the plug 20, as well as the axial pressures exerted on the plug 20 due to the welding pressures, also cause the back surface of the plug to bulge outwardly as is shown at 33.

During the welding operation the plug 20 is burned out simultaneously with the half pin 10 and the flash which is formed is thrown radially outwardly from the weld. No surfaces are presented on the inside of the pin on which this flash may gather.

Normally in crankshafts, what remains of plug 20 may be allowed to stay in the inside of the pin or journal. In the case of tubes, the plug may be drilled out. Such drilling operation will be relatively easy, however, because the metal remains in a machinable state as distinguished from flash which is extremely hard, brittle, and difficult to machine.

It will be appreciated that the plug need not extend beyond the end of the end or surface 12 at the beginning of the flash operations although such arrangement is preferred. With such arrangement both the plug and the end 12 are heated simultaneously. Generally, such heating of the plug is necessary so as to soften it so that during the upsetting operation the metal of the plugs can be deformed inwardly to permit the inwardly extending upset to form. It will be noted that because of the fact that the inner surface of the pin or bearing 10 is restrained and because no flash can form on the inner surface the upset formed has a smooth rounded surface. No crevices or the like in which high stresses can develop are present.

It is thus necessary in accordance with the invention that the back surface of the plug 20, that is, the surface remote from the end 12 being welded, must be spaced from the ultimate welded surface.

It will be appreciated that modifications and alterations of the invention will occur to others upon a reading and understanding of this specification, and it is our intention to include all such modifications and alterations insofar as they come within the scope of the appended claims.

Having thus described our invention, we claim:

1. A method of flash welding comprising providing a pair of hollow members having opposed surfaces to be burned away and welded in a flashwelding operation, disposing in the hollow of said members plugs of a length greater than the length of the flash burnoff and extending at least flush with said surfaces, simultaneously burning away said plugs and said members in a flashwelding operation and then bringing said members into pressure welding relationship.

2. A method of flashwelding hollow members so as to prevent the formation of flash on the inside of such members comprising positioning in the hollow of such members plugs of a length greater than the burnoff of the members during the flashwelding operation and extending at least beyond the surfaces of the members where the flashing will commence, burning off said plugs and said members simultaneously and then bringing the members and the plugs into pressure welding engagement.

3. A method of flashwelding hollow members so as to eliminate the formation of flash on the inside of such members comprising, providing a pair of members having surfaces to be flashwelded and hollow bores symmetrical relative to such surfaces, positioning in such bore plugs with a forced fit of a length greater than the burnoff in the flashwelding operation and projecting beyond said surfaces, bringing said members and plugs into flashwelding relationship, burning off the metal thereof and then bringing said members and plugs into forge welding relationship.

4. An article of manufacture comprising, a pair of hollow members each provided with a plug of a length less than said members, said members and said plugs having opposed surfaces in forge welded relationship, said members having an inwardly extending upset in the plane of the weld merging with the forge welded plugs.

5. A method of flash welding hollow members so as to prevent the formation of the flash on the inside of such members, comprising positioning in the hollow of such members, plugs so arranged that flashing will occur between the plugs at least at the end of the flashing cycle and so that at least a portion of the plugs will remain in abutting relationship with each other at the end of the flashing cycle.

References Cited in the file of this patent

UNITED STATES PATENTS

| | | |
|---|---|---|
| 1,302,413 | Murray | Apr. 29, 1919 |
| 1,363,355 | Sander | Dec. 28, 1920 |
| 1,679,701 | Wysong | Aug. 7, 1928 |
| 1,971,369 | Coryell | Aug. 28, 1934 |
| 2,049,411 | Abbe | Aug. 4, 1936 |

FOREIGN PATENTS

| | | |
|---|---|---|
| 463,802 | Great Britain | Apr. 7, 1937 |
| 618,920 | Germany | Sept. 18, 1935 |